United States Patent [19]

Forbes et al.

[11] Patent Number: 4,636,853
[45] Date of Patent: Jan. 13, 1987

[54] DYNAMIC AUDIO SCRAMBLING SYSTEM

[75] Inventors: Ronald L. Forbes; John A. Lund, both of McHenry, Ill.

[73] Assignee: Zenith Electronics Corporation, Glenview, Ill.

[21] Appl. No.: 564,973

[22] Filed: Dec. 21, 1983

[51] Int. Cl.⁴ .................. H04N 7/167; H04M 1/70
[52] U.S. Cl. ..................... 358/121; 358/124; 358/122
[58] Field of Search .............. 358/121, 122, 124; 179/1.5 S, 1.5 FS

[56] References Cited

U.S. PATENT DOCUMENTS

| | | | |
|---|---|---|---|
| 2,907,816 | 10/1959 | Weiss | 358/120 |
| 3,001,011 | 9/1961 | Weiss et al. | 358/120 |
| 3,478,166 | 11/1969 | Reiter et al. | 358/120 |
| 3,530,232 | 9/1970 | Reiter et al. | 358/120 |
| 3,919,462 | 11/1975 | Hartung et al. | 358/124 X |
| 4,250,524 | 2/1981 | Tomizawa | 358/124 X |
| 4,278,840 | 7/1981 | Morgan et al. | 179/1.5 S |
| 4,308,556 | 12/1981 | Osaka | 358/124 |
| 4,369,462 | 1/1983 | Tomizawa et al. | 358/124 |
| 4,389,671 | 6/1983 | Posner et al. | 179/1.5 FS X |
| 4,398,216 | 8/1983 | Field et al. | 358/121 |
| 4,410,911 | 10/1983 | Field et al. | 358/121 |

Primary Examiner—Stephen C. Buczinski
Assistant Examiner—Linda J. Wallace

[57] ABSTRACT

A multi-mode audio scrambling system includes an all-pass filter and a 90 degree phase shift circuit for supplying balanced modulators with 90 degree phase displaced audio information and 90 degree phase displaced carriers derived from the horizontal line frequency of a television receiver for producing a single sideband, suppressed carrier audio spectrum. A plurality of offset frequencies are derived from the horizontal line frequency and are used to further modulate the resultant signal to produce a single sideband displaced audio spectrum. A logic circuit selects the offset frequency (mode) in response to vertical interval signals, video inversion signals and audio tone or data signals. The final output is thus scrambled in different modes with different offset frequencies. A complementary unscrambling system is also described.

7 Claims, 4 Drawing Figures

DYNAMIC AUDIO SCRAMBLING SYSTEM

BACKGROUND OF THE INVENTION AND PRIOR ART

This invention relates generally to encoding and decoding systems and particularly to techniques for audio scrambling and unscrambling in pay television signal encoding systems.

So-called pay television systems, normally operated in connection with cable connected television subscription services, have grown in popularity and have given rise to a need for added security to restrict certain programming to those who have specifically subscribed and paid for it. Common techniques for television signal encoding include suppressing the horizontal sync pulses and randomly inverting the video information. The audio portion of the program may also be encoded by a number of well-known techniques.

A very old audio encoding scheme involves modulating the audio information with a small offset frequency to displace the entire audio information spectrum upwards in frequency. Doing this, as is well-known, destroys the harmonic relationship between the various frequencies in the audio information and contributes to a significant lack of intelligibility when the audio information is recovered. The larger the offset frequency, the greater the unintelligibility factor.

With present day sophisticated tecnhology, the simple audio encoding systems of the prior art are not secure in that they can be readily comprised. Consequently, there has been a great increase in the number of "pirate" decoders which offer the benefits of the encoded program material without remuneration to the owner. While the art of encoding has advanced to a very high state, secure systems are complex and expensive. Cable television system operators are reluctant to incorporate expensive systems because the cost must be passed on to their customers. Consequently, there is a need in the art for relatively secure audio encoding at low cost.

OBJECTS OF THE INVENTION

A principal object of this invention is to provide a novel audio encoding and decoding system.

A further object of this invention is to provide a novel audio scrambling and unscrambling system for use in a pay television encoding system.

A still further object of this invention is to provide a secure audio encoding and decoding system at low cost.

SUMMARY OF THE INVENTION

In accordance with the invention, a method and apparatus of audio encoding involves modulating audio information with a plurality of different offset signals to define different scrambling modes, the so-encoded signal being decoded in a complementary manner.

BRIEF DESCRIPTION OF THE DRAWINGS

Other objects and advantages of the invention will become apparent upon reading the following description thereof in conjunction with the drawings in which.

DESCRIPTION OF THE PREFERRED EMBODIMENT

The general technique of audio scrambling (encoding) and descrambling (decoding), based upon using an offset frequency for modulating audio information to displace the audio information by a given frequency in the spectrum is known and does not constitute any part of this invention. Since the technique is known in the art, it will be discused in very general terms here.

Audio information in a frequency spectrum of approximately 50 Hz to 15,000 Hz is shifted upward in frequency by an amount equal to a small offset frequency, generally from 2,000 Hz to 3,000 Hz, by a well known double conversion process. In the prior art this was accomplished by using a multiple of the 15,750 KHz horizontal line frequency of a television signal as a first carrier, deriving a fraction, such as 1/6, of the horizontal frequency for the offset frequency and modulating another carrier having a frequency equal to the first carrier plus the offset. In more detail, the first carrier, generally two to three times the horizontal line frequency, was modulated with the audio information, after which the lower sideband modulation products were selected by means of a bandpass filter. The output of the filter supplied another modulator which received a second carrier having a frequency equal to the first carrier frequency plus the offset frequency. For example, if the first carrier was three times the horizontal line frequency, the second carrier might be three and one-sixth times the horizontal line frequency. A second bandpass filter selected the lower sideband modulation products for application to an output amplifier. The result was a displacement of the audio information frequency spectrum by an amount equal to the offset frequency. Consequently, the audio information was scrambled since the displacement destroyed the harmonic relationship between the various audio frequencies.

Decoding was accomplished in substantially the same way as encoding. A high pass filter selected the detected scrambled audio which was then subjected to a double conversion process with carriers having frequencies that bore an identical offset relationship. The actual carrier frequencies were not critical and could well have been different from the encoding modulation carrier frequencies. However, the frequency offset of the carriers had to be the same. By appropriate selection of the modulation sidebands, the unscrambled audio information was delivered through a low pass filter to an amplifier.

Figure 1:
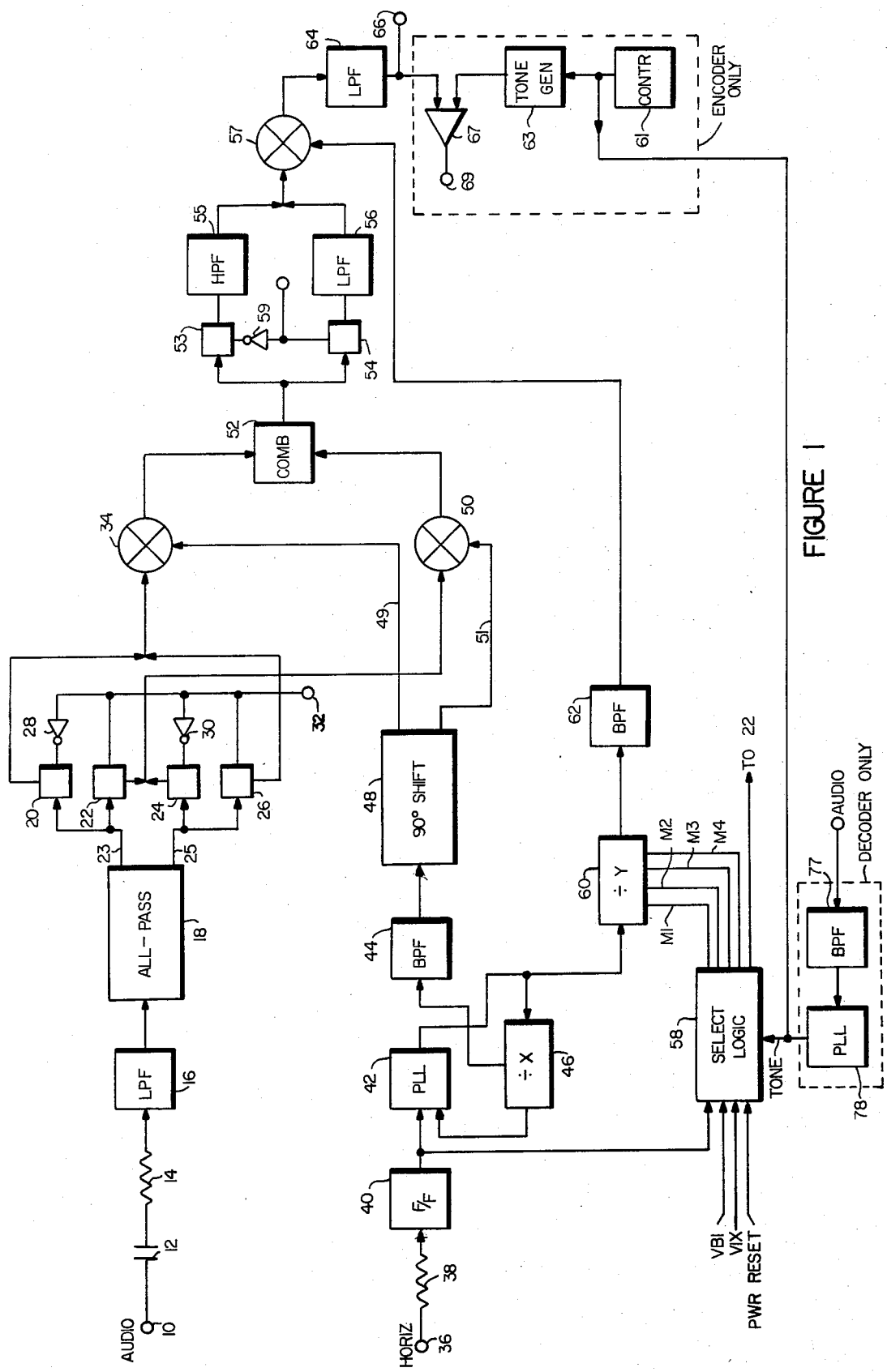
FIG. 1 represents a combined schematic and block diagram of an encoder/decoder for scrambling and unscrambling audio information in accordance with the invention.

As will be seen, the encoding and decoding circuits are almost identical. The block diagram of FIG. 1 is thus useful for both the encoder and decoder with the circuitry specific to encoding and decoding enclosed by dashed lines and suitably labelled. The description will generally pertain to the encoder with occasional reference to decoding.

An input terminal 10 receives baseband audio information ranging in frequency from 50 Hz to 13,000 Hz. The information is passed through a series connection of a capacitor 12 and a resistor 14 to a low pass filter 16 where frequencies above 13 KHz are removed before being supplied to an all-pass filter 18. All-pass filters are well known in the art and exhibit the characteristic of generating 90 degree phase displaced signal outputs for a given signal input. Thus, the two outputs of the all-pass filter always have a 90 degree relative phase with respect to each other. Practically speaking, all pass-filter 18 may comprise a plurality of operational amplifiers, each operating within a limited, but different, portion of the frequency band to assure the 90 degree phase displacement relationship at all frequencies of the output signals.

The two outputs 23 and 25 of all-pass filter 18 are supplied to a plurality of switches 20, 22, 24 and 26. The switches are controlled from a control terminal 32 which is directly connected to switches 22 and 26 and connected to switches 20 and 24 through a pair of inverters 28 and 30, respectively. A given signal on control terminal 32 results in opposite switching of the switch pairs 20-22 and 24-26, respectively. Switch 20 is effective to couple output 23 of all-pass filter 18 to one input of a balanced modulator 34, whereas switch 22 is effective to couple output 23 to one input of a balanced modulator 50. Similarly, output 25 of all-pass filter 18 is coupled by switch 24 to modulator 50 and, by switch 26, is coupled to modulator 34. It will thus be seen that the 90 degree phase displaced output signals of all-pass filter 18 may be alternately and reversibly coupled to balanced modulators 34 and 50 for the purpose of sideband selection as described later.

The offset frequency circuit includes an input terminal 36 for receiving television horizontal line frequency signals and pasing them through a current limiting resistor 38 to a monostable flip-flop (F/F) 40 which develops a square wave output H, of horizontal line frequency, in response to the horizontal input signal. F/F 40 is provided to preclude the double frequency horizontal pulses in the television signal vertical interval from appearing in its output. The output of F/F 40 is coupled to a phase lock loop (PLL) 42 which operates to develop an output, preferably between 2 and 4 MHz. The output of PLL 42 is connected to a divider 46, the output of which is returned to the PLL input. An intermediate output of divider 46 is coupled, through a bandpass filter 44, to a 90 degree phase shift circuit 48. Bandpass filter 44 develops a sine wave signal from the square wave signal input and has a frequency selected to pass the frequency chosen for modulating the audio, preferably twice the horizontal line frequency. The output of F/F 40 is also coupled to select logic 58.

The two 90 degree phase displaced outputs 49 and 51 of phase shift circuit 48 are supplied as the other inputs to balanced modulators 34 and 50 along with the 90 degree phase displaced switched outputs of all-pass filter 18. The outputs of the balanced modulators are supplied to a combiner circuit 52. As a result either the upper or lower sideband is canceled out by summing the 90 degree phase shifted signals in combiner 52. The actual sideband eliminated depends on which switches feeding balanced modulators 34 and 50 are enabled by the signal on terminal 32. This eliminates the need for expensive high pass and low pass filters. The output of combiner circuit 52 is coupled to another pair of switches 53 and 54, connected respectively to a high pass filter 55 and to a low pass filter 56. Both filters 55 and 56 are coupled to another balanced modulator 57. These switches are also alternately operated by a control signal on terminal 32, since terminal 32 is connected directly to switch 54 and to switch 53 through an inverter 59.

The output of PLL 42 is also supplied to a divider circuit 60. The net effect of PLL 42, divider circuit 46 and divider circuit 60 is to develop an output signal from divider 60 that has a frequency which bears a fractional relationship to the horizontal input signal H. The actual frequency is dependent upon the ratio of division factors X to Y and may be changed by changing divider 60. Thus, divider circuit 60 is the source of the offset frequencies used for scrambling of the audio information by double conversion. The output of divider circuit 60 is supplied through a bandpass filter 62 to the other input of balanced modulator 57. The output of balanced modulator 57 is supplied through a low pass filter 64, to an output terminal 66 which is the output of the decoder. Terminal 66 is shown connected to one input of a summing amplifier 67 whose output terminal 69 is the output for the encoder. A control circuit 61 is connected to a tone generator 63 which supplies the other input of summing amplifier 67 and to a tone input of select logic 58. The output of summing amplifier 67 is coupled to encoder output terminal 69. It will be noted that control 61, tone generator 63 and summing amplifier 67 are enclosed in a dashed line box labelled ENCODER ONLY.

A number of additional input signals are coupled to select logic circuit 58: a vertical blanking invertal signal (VBI) is supplied for each vertical field in the television signal; a randomly occurring video inversion signal (VIX) is generated when the video information reaches a selected video level; and a power-up reset signal. Another connection to the tone input of select logic 58 is from audio terminal 10, through a band pass filter 77 and a phase lock loop tone detector 78. BPF 77 and PLL 78 are enclosed in a dashed line box labelled DECODER ONLY and are only used in the decoder version.

The output of select logic 58 comprises a plurality of leads labelled M1, M2, M3 and M4 signifying four different scrambling modes of the preferred embodiment. Each scrambling mode represents a different offset frequency. The leads M1-M4 are coupled to divider circuit 60 to change the divider ratio and develop the different offset frequencies. A fifth output of select logic 58 is connected to control terminal 32 and develops a control signal for simultaneously switching the all-pass filter outputs 23 and 25 and the high and low pass filters 55 and 56. It should be apparent that both the all pass-filters and the 90 degree phase shift circuit may have their outputs switched, the result being a change in the sideband information selected. Since the only criterion for decoding is that the decoder sideband selection modes and scrambling modes correspond with those at the head-end or encoder, an appropriate signal may be supplied to enable the decoder to follow the operating mode of the encoder. When the upper sideband information is selected, the high pass filter is used and when the lower sideband information is selected, the low pass filter is used.

As mentioned, the dashed line blocks delineate the special decoder circuitry and the special encoder circuitry. For encoding, a tone signal is added via summing amp 67, whereas during decoding, the tone is signal detected. Low pass filter 16 in the decoder would need to pass the 13 KHz audio plus the offset frequency and would thus require a higher cutoff. To repeat, the decoder carrier frequencies need not be the same as those in the encoder—only the offset frequencies corresponding to the scrambling modes, need be the same.

Figure 2:
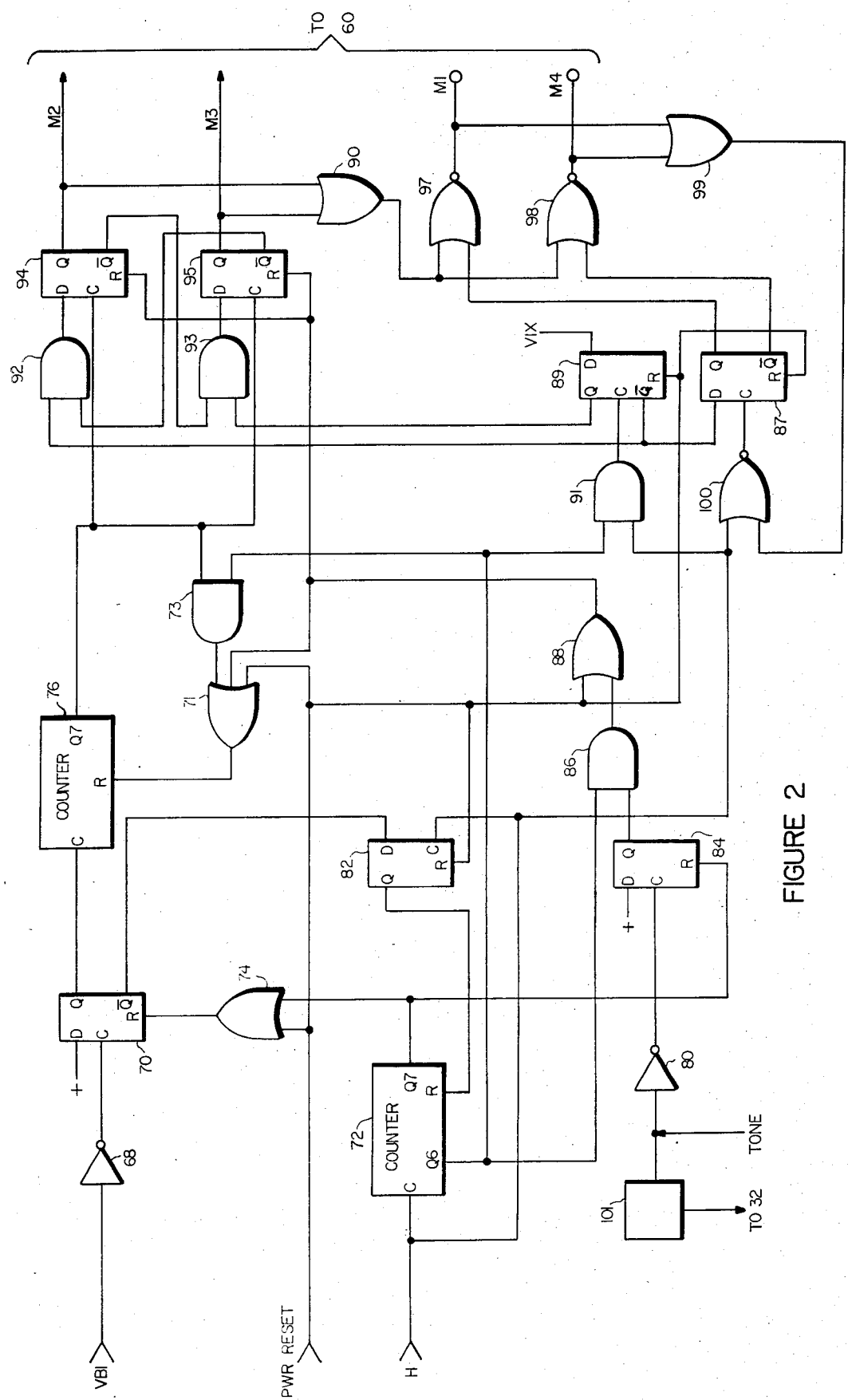
FIG. 2 is a logic diagram of the selection means of FIG. 1.

In FIG. 2, the detail logic circuit of select logic 58 is shown. As indicated, this circuit may also be used for both the encoder and decoder. The vertical interval VBI signals are supplied through an inverter 68 to set a latch 70 for passing the successive vertical interval signals to clock a counter 76. When latch 70 is set, its Q terminal is high and its $\overline{Q}$ terminal is low. When the unit, that is the encoder or decoder, is turned on, a power reset pulse resets latches 82, 87 and 89 directly, resets latch 70 through an OR gate 74 and resets latches 94 and 95 through an OR gate 88. Counter 76 is reset through an OR gate 71. This series of events sets the select logic circuit for operation in mode 1.

The horizontal input signal H clocks a counter 72 having outputs Q6 and Q7. When a particular count has been reached by counter 72, Q7 goes high which results in resetting of a latch 84. The Q6 output of counter 72 and the input VIX provide proper signals to set latch 89 and develop a latched VIX signal at its Q output.

The tone input to latch 84 is a digital signal that is derived from a tone of predetermined frequency in the output of PLL/detector 78 in FIG. 1 and is supplied through an inverter 80. It will be appreciated that a data signal, such as a pulse signal, may be provided rather than an audio tone. In that event, PLL detector 78 and BPF 77 and the tone generator in FIG. 1 would not be needed. Counter 72 and latch 84 establish a starting point for mode scrambling. If latch 84 has been set, it will be reset at a known point when counter 72 counts a predetermined number of horizontal lines after the vertical interval signal. Since the Q terminal of latch 84 is connected to an AND gate 86 along with the Q6 terminal of counter 72, setting of the latch enables AND 86, the output of which is connected to OR 88 which sets operation for mode 1 or for mode 4 (mode ¼) and resets counter 76.

The tone input to the select logic is also supplied to a width detector 101 for determining whether the tone signal (or data signal) has a duration in excess of a predetermined minimum. The output of width detector 101 is supplied to control terminal 32 (FIG. 1) and is positive or zero depending upon the signal duration.

The Q7 output of counter 72 is connected to the reset terminal of latch 70 through OR 74 and the $\overline{Q}$ terminal of the latch is connected, via a latch 82, to the reset terminal of the counter. The power circuit resets latch 70 which makes the Q output of latch 82 high on the next pulse, which inhibits counting of counter 72. The next VBI supplied signal to latch 70 sets the latch, driving its Q terminal low. The Q output of latch 82 then goes low on the next pulse enabling counter 72 to count horizontal lines. Further VBI pulses clock counter 76. When counter 76 reaches a predetermined count, it sets either latch 94 or 95 depending on the VIX latch 89 status at that time. This causes the mode to change from ¼ to ⅔, depending on the current VIX latch 89 state.

Nothing further in the way of mode changing occurs until a tone signal is detected and sets latch 84. The Q output of latch 84 goes high and enables AND 86. When Q6 of counter 72 goes high, indicating a given number of horizontal lines have been counted, AND 86 operates to set a return to mode 1/4 through OR 88. When counter 72 counts up until Q7 goes high, it resets latch 84 to disable AND 86. Latch 70, via latch 82, resets counter 72.

The four different scrambling modes are determined by the various signals and the interconnection of gates 90, 92, 93, 97, 98 and 99 and latches 94 and 95. The output of OR 88 is connected to the reset terminals of latches 94 and 95 which are reset to drive their Q terminals low and their $\overline{Q}$ terminals high. This occurs when the unit is turned on or when AND 86 is operated in response to a predetermined horizontal line count by counter 72 and the presence of a tone signal. OR 88 is also connected to OR 71 for resetting counter 76.

The Q output of latch 94 denotes the second scrambling mode M2 and the Q output of latch 95 denotes the third scrambling mode M3. When reset, these Q outputs are both low and the corresponding $\overline{Q}$ outputs are high. When the Q outputs of both latches 94 and 95 are low, the output of OR gate 90 goes low enabling NOR gates 97 and 98. The output of OR 90 may be used directly to initiate mode 1 operation. However, in a further aspect of the invention, a fourth scrambling mode of operation is readily obtained by the addition of NOR gates 97 and 98. OR gate 90 is supplied as an input to each of NOR's 97 and 98, their other inputs being supplied with high or low logic level signals as a function of the presence or absence of the VIX signal. The latched VIX signal from the Q terminal of latch 87 is connected directly to the second input of NOR 97 and the $\overline{Q}$ terminal of latch 87 is connected directly to an input of NOR 98. If the previous VIX signal at the Q output of latch 87, at the time of reset of latch 94 and latch 95 is low, mode 1 is selected. If the inversion signal is present represented by the Q output of latch 87 being low, mode 4 is selected. As described above, upon initial power on to the unit, mode 1 is selected. When either mode 1 or mode 4 is selected, the output of OR gate 99 goes high and latch 87 is inhibited from changing via NOR gate 100. As a result, a later change in the current real time VIX status as represented by latch 89 will not cause a mode change from mode 1 to mode 4 or vice-versa, prior to the Q7 output of the VBI counter 76 going high or a tone being received.

Counter 76, on the other hand, is enabled to begin counting again by removal of the high level signal from its reset terminal. When counter 76 reaches a predetermined count, its Q7 output sets either latch 94 or 95 depending on the status of latch 89, and through OR 90, terminates operation in mode ¼. When Q7 of counter 76 goes high, it also enables AND 73 so that when the Q6 output of counter 72 goes high, counter 76 will be reset via OR gate 71. Depending upon the high or low state of the latched VIX of latch 89, either AND 92 or AND 93 will be activated to set its corresponding latch when Q7 of counter 76 goes high. If the VIX latch 89 Q output is low, $\overline{Q}$ is high, and AND 92 sets latch 94, driving its Q terminal high and establishing mode 2 operation. The $\overline{Q}$ terminal of latch 94 goes low and disables AND 93 to preclude operation of latch 95. If the VIX latch 89 Q output is high, $\overline{Q}$ is low, and AND 93 sets latch 95 to establish mode 3 operation and cuts off AND 92. The VIX signal presented to the D input of latch 89 is latched when Q6 of counter 72 and H are both high. Latch 87 is updated to latch 89 status at the H rate when in mode 2 or 3.

The mode switching is random since the VIX signal is dependent upon the level of video information in the television signal. Also the tone signal is controllable by the system operator, either externally or in response to some aspect of the television signal. As mentioned, the tone detector and latch circuitry for AND 86 may be replaced by a data pulse input signal of controlled duration and timing. The use of the duration of the tone signal or data signal to select the sideband information to be transmitted obviously introduces a further mode of encoding to the system. Other variants will be readily apparent. Since any single encoding mode with an offset frequency of 2 KHz or more is sufficient to make the detected audio unintelligible, the variety of scrambling modes is for security purposes. Thus it may be seen that with a relatively simple collection of logic hardware, a relatively secure audio scrambling system is obtained.

Figure 3:
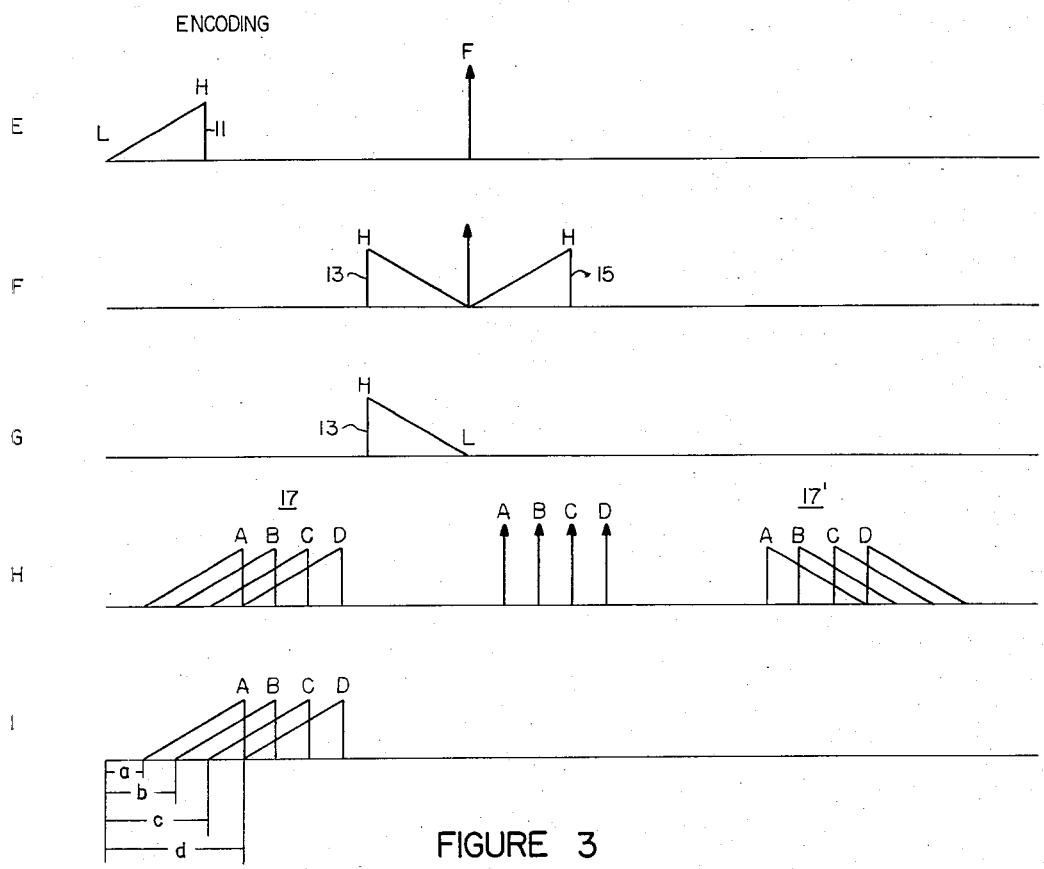
FIG. 3 is a spectrum diagram pertaining to scrambling of the audio information.

The waveforms in FIG. 3 pertain to the encoding part of the system. Waveform E represents the audio information spectrum, from 0 to 13 KHz, with respect to a carrier of frequency F. The triangular configuration is used to indicate the low and high frequency ends of the spectrum as indicated by the letters L and H. This conventional notation is well-known. Waveform F shows the double sideband modulation of carrier F with the audio information contained in a lower sideband 13 and an upper sideband 15. Waveform G illustrates the lower sideband selected for encoding. Waveform H illustrates four different offset carrier frequencies A, B, and C and D and the similarly identified resultant sidebands associated therewith. The carriers are seen to be displaced by different amounts from carrier frequency F in the preceding waveforms. The group of displaced lower sidebands is indicated as 17 and the group of displaced upper sidebands by 17'. Waveform I represents the various sideband information upwardly displaced in frequency by amounts "a", "b", "c", and "d" with the carriers and upper sideband information suppressed. Waveform I thus represents the transmitted frequency spectrum for the four scrambling modes in accordance with the invention.

Figure 4:
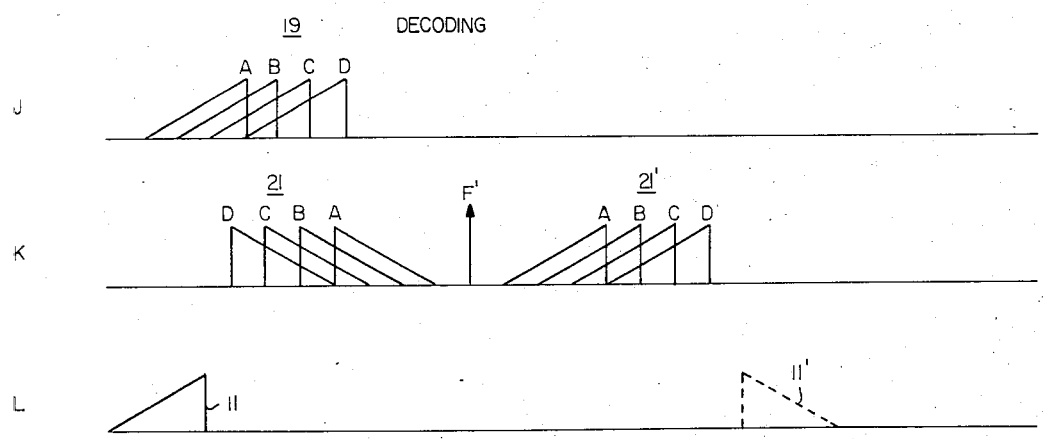
FIG. 4 is a spectrum diagram pertaining to decoding of the scrambled audio information.

In FIG. 4, decoder waveforms are shown with Waveform J being substantially the same as Waveform I in FIG. 3. Waveform K results from modulation of the frequency waveform J with a carrier F' to produce lower sideband 21 and upper sidebands 21'. In order for the proper offset carriers to be used, the upper sideband of waveform K is selected for decoding since the lower sideband was selected for encoding. If the upper sideband had been selected for encoding, then the lower sideband would be selected for decoding. Thus, upper sideband signals A, B, C or D of waveform K are mix in balanced modulator 57 of FIG. 1 with the appropriate offset carrier A, B, C or D as was shown in encoding waveform H of FIG. 3. It will be appreciated that a different group of offset frequencies would be needed depending upon which sideband information was transmitted. Waveform L of FIG. 4 represents the demodulated audio spectrum 11 with the upper sideband information 11' (dashed lines) having been removed.

As mentioned, the scrambling process by double conversion with offset carriers is well known in the art. It will be further appreciated that while the decoder circuitry is substantially identical to the encoding circuitry it need not use the same frequency carriers as those used during encoding. The only criterion is that the offset frequencies be the same. It will be further seen by those skilled in the art that various techniques of sideband selection may be employed for encoding purposes as long as the decoding circuitry tracks or follows the encoding. To that end a control signal is needed to indicate to the control circuitry the particular sidebands that have been selected. Similarly it should be apparent that the various signals used to determine the described scrambling modes and their frequencies may be interchanged, or completely different signals may be used. In particular, the horizontal signal H may be derived from a crystal oscillator or the like and need not be related to the horizontal line frequency of a television receiver. This, of course, further improves the security of the encoding system.

With the invention a relatively secure audio encoding system is provided in an economically attractive manner. Since the system incorporates a number of randomly occurring signals, it would be difficult for so-called pirates to unscramble the audio without knowledge of the circuitry involved.

What has been described is a novel audio scrambling system having a high level of security. It is recognized that numerous changes in the described embodiment of the invention will be apparent to those skilled in the art without departing from the true spirit and scope thereof. The invention is to be limited only as defined in the claims.

What is claimed is:

1. An audio scrambling system for use in connection with a television signal encoding system having control signals including a vertical interval signal, a video inversion signal, and a data signal;
    a source of audio information;
    a source of horizontal signal;
    means for deriving a plurality of offset frequencies from said horizontal signal;
    means for modulating said audio information with different ones of said plurality of offset frequencies for defining different audio scrambling modes;
    selection means including logic means for determining said different scrambling modes in response to said control signals;
    said data signal determining a first scrambling mode, said vertical interval signal determining a change from said first scrambling mode, and said video inversion signal determining whether said change from said first scrambling mode is to a second scrambling mode or to a third scrambling mode.

2. The system of claim 1 wherein said change from said first scrambling mode occurs after a predetermined number of vertical interval signals and further including:
    means for changing to a fourth scrambling mode rather than to said first scrambling mode responsive to said video inversion signal.

3. The system of claim 2 wherein said data signal comprises a tone of predetermined frequency, the presence of said tone initiating said first scrambling mode or said fourth scrambling mode.

4. The system of claim 3 further including means responsive to the duration of said tone and producing an additional control signal for changing the scrambling of said audio information.

5. An audio decoder in a television signal decoder system for decoding a single sideband scrambled audio signal that has been dynamically scrambled in a plurality of modes, with a different offset frequency defining each mode, in response to a plurality of control signals comprising:
    means for generating corresponding offset frequencies;
    logic means for determining the scrambling modes from said control signals and selecting the offset frequencies corresponding thereto;

means generating a data signal for determining a first scrambling mode;

means generating a vertical interval signal for determining when a change in scrambling mode from said first scrambling mode has occurred;

means generating a video inversion signal for determining whether the change in scrambling mode is from said first scrambling mode to a second scrambling mode or whether the change is from said first scrambling mode to a third scrambling mode; and means for selectively applying said offset frequencies to descramble said audio signal.

6. The decoder of claim 5 wherein said change from said first scrambling mode occurs after a predetermined number of vertical interval signals and wherein the presence of said video inversion signal determines a change to said third scrambling mode rather than to said second scrambling mode.

7. The decoder of claim 6, further including means responsive to the absence of said video inversion signal for determining a change to a fourth scrambling mode.

* * * * *